(12) United States Patent
Todd et al.

(10) Patent No.: US 9,778,931 B2
(45) Date of Patent: Oct. 3, 2017

(54) DATA VALUATION BASED ON DEVELOPMENT AND DEPLOYMENT VELOCITY

(71) Applicant: EMC Corporation, Hopkinton, MA (US)

(72) Inventors: Stephen Todd, Shrewsbury, MA (US); Aidan J. O'Brien, Paris (FR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/998,112

(22) Filed: Dec. 24, 2015

(65) Prior Publication Data
US 2017/0185396 A1 Jun. 29, 2017

(51) Int. Cl.
G06F 9/44 (2006.01)
G06F 9/445 (2006.01)

(52) U.S. Cl.
CPC . *G06F 8/77* (2013.01); *G06F 8/60* (2013.01)

(58) Field of Classification Search
CPC ...................................... G06F 8/60; G06F 8/77
USPC .................................................. 717/120–123
See application file for complete search history.

(56) References Cited

U.S. PATENT DOCUMENTS

| | | | | |
|---|---|---|---|---|
| 6,715,145 B1 * | 3/2004 | Bowman-Amuah | ..... | G06F 8/20 718/100 |
| 7,890,451 B2 * | 2/2011 | Cancel | ................ | G06F 17/3089 707/603 |
| 7,970,729 B2 * | 6/2011 | Cozzi | ................ | G06F 17/30604 707/601 |
| 8,561,012 B1 * | 10/2013 | Holler | .................... | G06Q 10/06 717/102 |
| 2014/0052489 A1 * | 2/2014 | Prieto | .................... | G06Q 10/06 705/7.23 |

OTHER PUBLICATIONS

Timo Lehtonen et al., "Defining Metrics for Continuous Delivery and Deployment Pipeline", Oct. 2015, in Proceedings of the 14th Symposium on Programming Languages and Software Tools, Tampere, Finland, pp. 16-30.*
Hartmann et al., "Appropriate Agile Measurement: Using Metrics and Diagnostics to Deliver Business Value", 2006, IEEE, 6 pages.*
Kupiainen et al., "Why Are Industrial Agile Teams Using Metrics and How Do They Use Them?", 2014, ACM, 7 pages.*
U.S. Appl. No. 14/863,783 filed in the name of Stephen Todd et al., filed Sep. 24, 2015 and entitled "Unstructured Data Valuation."
U.S. Appl. No. 14/973,096 filed in the name of Stephen Todd et al., filed Dec. 17, 2015 and entitled "Data Set Valuation for Service Providers."

(Continued)

*Primary Examiner* — Ted T Vo
(74) *Attorney, Agent, or Firm* — Ryan, Mason & Lewis, LLP

(57) ABSTRACT

One or more metrics indicative of velocity attributes associated with development and deployment of an application program are obtained. The one or more velocity metrics are stored in an application run-time environment in association with the application program and one or more data sets output by the application program. A valuation is computed for the one or more data sets based on the one or more velocity metrics.

20 Claims, 6 Drawing Sheets

(56) References Cited

OTHER PUBLICATIONS

U.S. Appl. No. 14/973,141 filed in the name of Stephen Todd et al., filed Dec. 17, 2015 and entitled "Automated Data Set Valuation and Protection."
U.S. Appl. No. 14/973,178 filed in the name of Stephen Todd, filed Dec. 17, 2015 and entitled "Timeliness Metrics and Data Valuation in Distributed Storage Systems."
U.S. Appl. No. 13/923,791 filed in the name of Stephen Todd et al., filed Jun. 21, 2013 and entitled "Data Analytics Computing Resource Provisioning."
U.S. Appl. No. 14/744,886 filed in the name of Marina Zeldin et al., filed Jun. 19, 2015 and entitled "Infrastructure Trust Index."
Wikepedia, "Value Chain," https://en.wikipedia.org/w/index.php?title=Value_chain&printable=yes, Jun. 6, 2016, 7 pages.
Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.
Nicole Laskowski, "Six Ways to Measure the Value of Your Information Assets," Tech Target, http://searchcio.techtarget.com/feature/Six-ways-to-measure-the-value-of-your-information-assets?vgnexffmt=print, May 8, 2014, 3 pages.
R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

* cited by examiner

100

200

300

400

500

600

700

DATA VALUATION BASED ON DEVELOPMENT AND DEPLOYMENT VELOCITY

FIELD

The field relates generally to information processing systems, and more particularly to software development and deployment in information processing systems.

BACKGROUND

The development of a software application program ("application") and subsequent deployment of the application within an information processing system, such as a cloud computing platform accessible by application users, are two of the most important aspects of the lifecycle of the application. An entity that relies on an application for client interaction (e.g., sales, communications, information, etc.) realizes that any tools for improving the development and/or deployment processes can be extremely valuable.

Development tools exist for assisting entities with application development. Likewise, deployment tools exist for assisting entities with application deployment. However, in an environment where application availability and performance is critical to an entity, these existing tools alone do not address many other important issues and challenges facing the entity.

SUMMARY

Embodiments of the invention provide information processing techniques for providing data valuation based on development and deployment velocity attributes associated with an application and its data.

For example, in one embodiment, a method comprises the following steps. One or more metrics indicative of velocity attributes associated with development and deployment of an application program are obtained. The one or more velocity metrics are stored in an application run-time environment in association with the application program and one or more data sets output by the application program. A valuation is computed for the one or more data sets based on the one or more velocity metrics.

Advantageously, illustrative embodiments of the invention carry forward development and deployment metrics, along with the application being deployed, into the infrastructure level (i.e., application run-time environment) in order to be available for correlation by a data value framework. Once these metrics are stored and associated with analytic output, they can then be used to make statements of value for specific data sets.

These and other illustrative embodiments include, without limitation, apparatus, systems, methods and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

As used herein, the following terms and phrases have the following illustrative meanings:

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"structured data" illustratively refers to data that resides in fixed fields within a document, record or file, e.g., data contained in relational databases and spreadsheets;

"unstructured data" illustratively refers to data that is not considered structured data (in which case, some "semi-structured" data asset may also be considered unstructured data), e.g., documents, free form text, images, etc.; and "velocity" illustratively refers to a metric representing one or more measures of time associated with the performance of one or more tasks, jobs, etc. For example, velocity can represent the number of units of work (e.g., tasks, jobs, etc.) completed in a given time interval (epoch), or the number of time intervals expended to complete a given unit of work. How the units of work and the intervals of time are defined is dependent on the project.

As will be further explained herein, illustrative embodiments of the invention recognize that the speed of software development and deployment yields analytic output with significant value and, as such, provides systems and methodologies for calculating value based on development and deployment metrics. In one example, such value can be computed for consumption by an entity such as a business.

Figure 1:
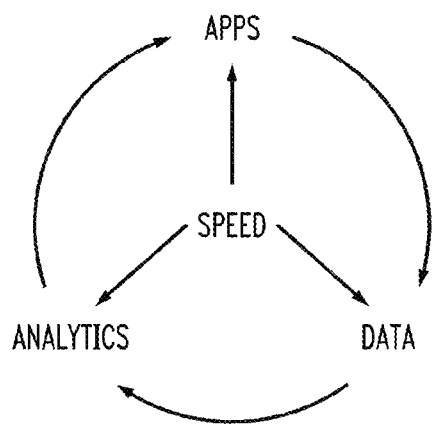
FIG. 1 illustrates an iterative analytic process associated with application development and deployment according to an embodiment of the invention.

FIG. 1 illustrates an iterative analytic process 100 associated with application development and deployment according to an embodiment of the invention. As summarized by the illustration, applications generate data, and this data is consumed by analytic software programs ("analytics"). Analytics, in general, are software programs designed to perform some type of analysis on data, e.g., business analytics performed on data generated by an application run by a business entity. The analytic output has a specific value to the entity which can be improved via the addition of new algorithms that analyze data in better ways, and thus can improve upon application development and deployment.

Application development tools exist. By way of example only, Tracker® is a project planning tool from Pivotal Labs (Palo Alto, Calif.) that allows teams to collaborate and react to changes in the project. A project in Tracker® may therefore be an application development project. Tracker® maintains a prioritized backlog of project deliverables, broken down into small, estimated pieces, called stories, and dynamically groups these stories into fixed segments of time, called iterations, and it predicts progress based on historical performance.

Likewise, application deployment tools exist. By way of example only, CloudFoundry® from Pivotal Labs (Palo Alto, Calif.) provides application developers with the functionality of a versatile Platform-as-a-Service (PaaS) application deployment layer. One of the main benefits of the PaaS application deployment layer is that, by controlling deployment of an application to a specific platform (e.g., specific data center or cloud infrastructure or other run-time environment), the PaaS application layer abstracts the application developer away from the specific hardware architecture of the data center/cloud where the application is intended to be deployed.

As will be further explained herein, illustrative embodiments of the invention store and associate output from application development and deployment tools with actual data output. This storage and association serves as part of a methodology for measuring the value of subsequently generated data emanating from the application.

Figure 2:
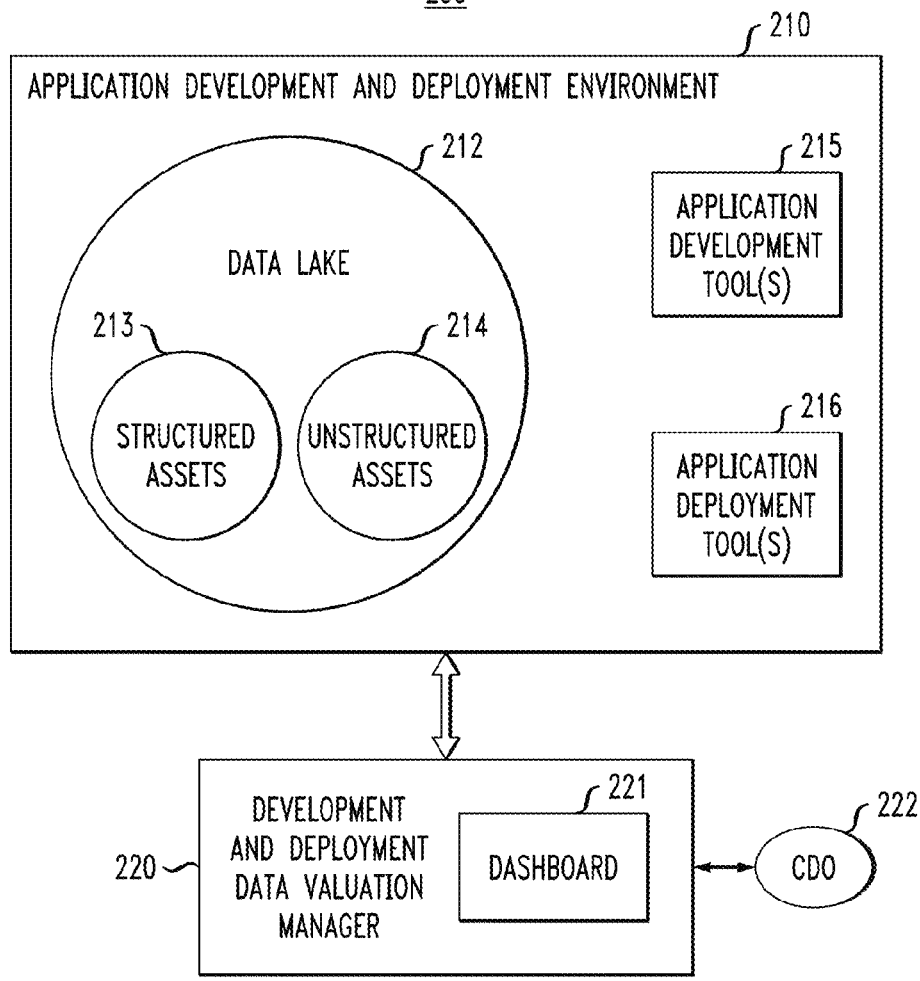
FIG. 2 illustrates a development and deployment data valuation management environment according to an embodiment of the invention.

Accordingly, FIG. 2 illustrates a development and deployment data valuation management environment 200 according to an embodiment of the invention. As shown, environment 200 comprises an application development and deployment environment 210. Application development and deployment environment 210, itself, comprises a data lake 212 which stores, inter alia, structured assets 213 and unstructured assets 214. A data lake is a functionally centralized data repository maintained by an entity. The data lake 212 can also be the run-time environment (e.g., infrastructure) for the application being developed and deployed. Assets, as illustratively used here, refer to data sets. In addition, as shown, environment 210 comprises an application development tool 215 and an application deployment tool 216. One non-limiting example of application development tool 215 is the above-mentioned Tracker® product. One non-limiting example of application deployment tool 216 is the above-mentioned CloudFoundry® product. It is to be appreciated that other types of assets and other development and deployment tools may be implemented in environment 210.

In addition to environment 210, development and deployment data valuation management environment 200 comprises a development and deployment data valuation manager 220 with a dashboard 221. Manager 220 is a component that can be utilized by an entity to provide data valuation methodologies and results to improve upon development and deployment of applications. One example of an individual user of manager 220 is a chief data officer (CDO) 222 of a business entity. Of course, other users and entities would benefit from the functionalities provided by manager 220 to be described in further detail herein. Users here may also be other computing systems. Development and deployment data valuation manager 220 is configured to provide many advantageous functions as will now be described. Such functions will be illustrated and described in the context of FIGS. 3-7.

It is realized here that agility and speed in the development and deployment of an application is tied to the business value of the data being analyzed. Manager 220 associates data with the development/deployment cycle of software related to that data. The velocity of a software development/deployment team (e.g., how quickly valuable features/bugs are developed and subsequently deployed) is now captured and associated with the data generated by the application in accordance with manager 220. It is similarly realized that the speed at which an entity is able to acquire and deploy data for subsequent analytics is likewise critical to the value that the business can extract from the data. Manager 220 is configured to provide a measure of such speed.

By way of example, assume an application is in the form of an analytic model. If an analytic model (model A) is generating analytic output, and it is determined that this model needs to be modified, the time it takes to develop and deploy the new model (model B) is now, in accordance with manager 220, associated with the newly deployed analytic model.

Furthermore, if an analytic model lacks data, a new application (or existing application) is developed or modified to produce relevant longitudinal data. The time taken to develop/deploy this new functionality is now, in accordance with manager 220, associated with the data generated by the new functionality.

Still further, the velocity of fixing software errors (bugs) that improve analytic output is now associated with a higher-quality analytic output, in accordance with manager 220.

It is also realized that error fixing in analytic models not only increases the value of the new output but decreases the value of previous (error-filled) analytic results. Manager 220 provides a mechanism for retroactively downgrading the value of data based on newly-found model errors.

As new iterations of analytic models are released into production (i.e., deployed), they begin to generate new output. Manager 220 correlates the output with the complexity of the new version (e.g., how aggressively did the development team work) or whether or not the new version was feature-based, error-based, or both. These measures have an impact on data value and are captured and available for review.

Further, the value to a business of new data generated from an analytic model is higher based on the speed at which that new model was developed and deployed. The business can now utilize manager 220 for generating this measurement. As analytic models are iterated and improved, the outputs associated with these models are correlated with velocity over time. Continually-refreshed versions of software represent increased data value. Conversely, if analytic models are not being continually updated over time, this could mean a decline in the value of data sets generated by these models. Manager 220 allows an entity (CDO 222) to obtain these metrics and take appropriate actions. One or more interfaces (e.g., graphical user interface, application programming interface) are provided by manager 220 in the form of dashboard 221 that allow the entity to view data value through the lens of velocity.

Accordingly, illustrative embodiments of the invention, through manager 220 and environment 210, gather metrics generated by toolsets used in the development (215) and deployment (216) of software versions and associates them with analytic output. Given that modern frameworks are beginning to integrate the development and the deployment of code as a continuous flow from developer to infrastructure, illustrative embodiments carry forward development and deployment metrics, along with the application being deployed, down into the infrastructure level, e.g., a data lake 212, in order to be available for correlation by a data value framework (implemented within manager 220). Once these metrics are stored and associated with analytic output, they can then be used to make statements of value for specific data sets.

For example, it is realized that development teams often use tools (e.g., Pivotal Tracker®) that assist in the capture of requirements, estimates, releases, etc. This data is already captured and can be used to gauge the velocity of a development team or initiative. Illustrative embodiments provide a mechanism, in the form of manager 220, that passes this captured data towards the deployment mechanisms.

Further, deployment frameworks (e.g., CloudFoundry®) can accept production-ready code from a repository and move it through the build process all the way out to an infrastructure that runs the new functionality. In accordance with illustrative embodiments, manager 220 augments this process by inputting a pointer or record referencing the development metrics associated with the new code.

When the development team has committed production-ready code into a repository, the deployment framework has a series of steps to undergo to move this code into the production environment. The speed and agility at which this pipeline operates impacts the value of the analytic data generated. Therefore, manager 220 instruments the deployment process and captures timestamps for each stage and then associates this data with the previously input development metrics.

The final step of deploying new functionality onto an infrastructure, in accordance with manager 220, includes the step of permanently associating the development and deployment metrics with the live application and the data sets generated by that application. As the algorithms begin running and generating new data, the framework is fully aware of the location of the associated metrics. Further, as applications are updated and deployed, the corresponding metrics that come along with that update are associated as well and a new epoch begins. The metrics that were in place previous to this new deployment are then archived in order to maintain their association with the data sets generated during the previous epoch.

Calculating the value of a data set, via manager 220, includes associating the data with the velocity and deployment metrics that are currently in place during the epoch. These valuation algorithms can take into account a wide variety of development and deployment characteristics, including but not limited to: descriptions of individual or collective features; descriptions of individual or collective errors; names of releases; complexity estimates of individual or collective features/errors; the amount of time taken on any stage of the development process; and how long the code idly resided in a repository for deployment.

Furthermore, as new deployments of applications generate new analytic output with associated development/deployment metrics, the analysis of analytic outputs from previous epochs may be altered. For example, if version 10 of an application fixed a significant error in an analytic model, the value of the data from version 9 may be decreased as a result.

Manager 220 provides a dashboard 221 that can sit effectively above the data sets and corresponding development/deployment metrics and provide visualization of present and historical data value based on these metrics. This allows a business, for the first time, to directly correlate the value of their data assets as a result of the output of their developers, their tools, their development teams and their deployment frameworks.

Given the above illustrative description of functionalities associated with development and deployment data valuation manager 220, exemplary use cases will now be provided in the context of FIGS. 3-8 to illustratively describe features of the velocity metric capture/association and data valuation methodologies performed by manager 220. That is, steps/components described in the context of FIGS. 3-8 are understood to be part of either manager 220, application development and deployment environment 210, or some combination thereof.

It is to be appreciated that the exemplary use cases assume use of Pivotal Tracker® as the application development tool 215, CloudFoundry® as the application deployment tool 216, and that the subject application is a retail application to which the retail entity wishes to add shopper location functionality. Embodiments of the invention, however, are not so limited.

Figure 3:
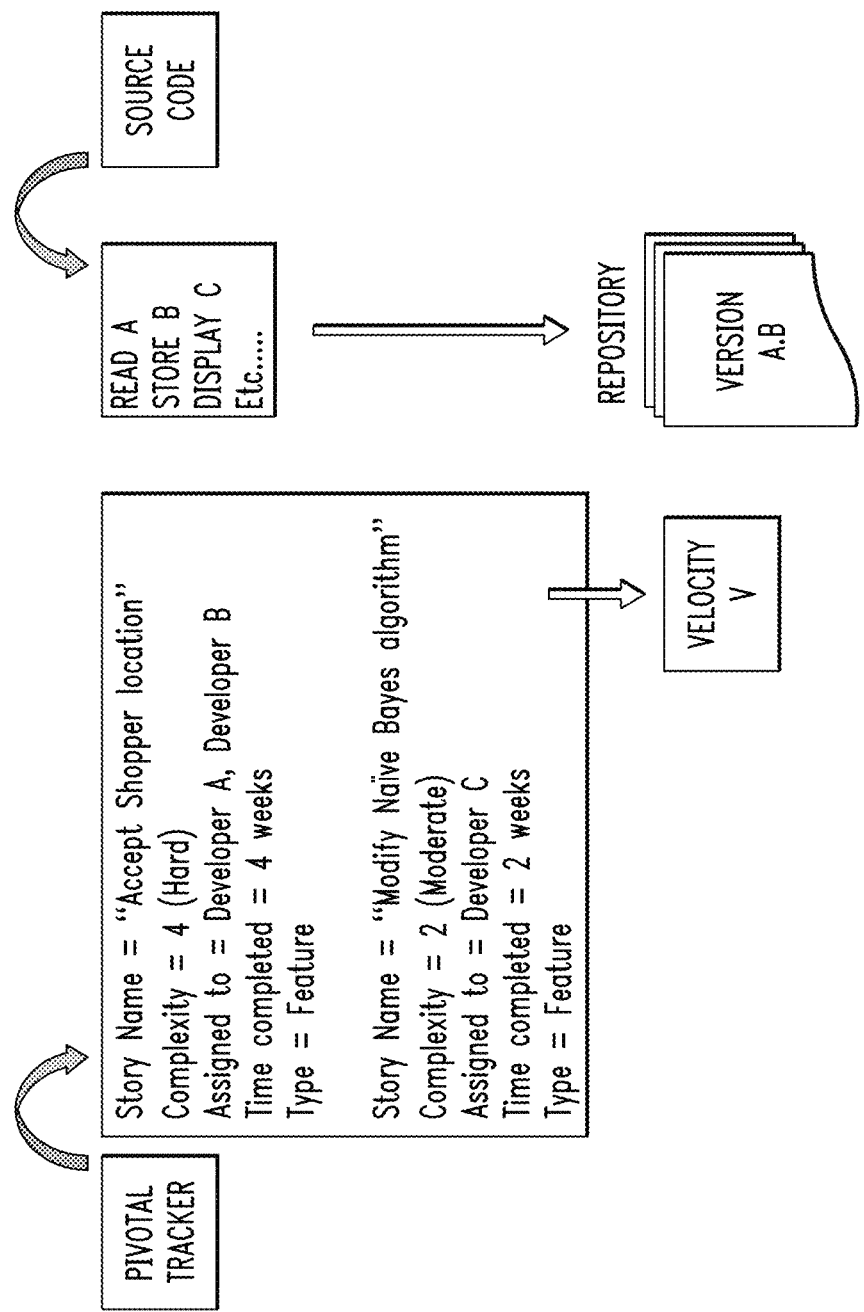
FIG. 3 illustrates capturing and forwarding a velocity metric in a development and deployment data valuation management environment according to an embodiment of the invention.

As depicted in methodology 300 in FIG. 3, assume a team of developers modifies a retail application to accept the shopper's physical location and make recommendations to entice increased purchases. The development team opens up a development tool (e.g., Pivotal Tracker®) and enters the following velocity metrics:

Story Name="Accept Shopper location"
Complexity=4 (Hard)
Assigned to =Developer A, Developer B
Time completed=4 weeks
Story Name="Modify Naïve Bayes algorithm to accept location"
Complexity=2 (Moderate)
Assigned to =Developer C
Time completed=2 weeks The velocity metric V for this release is stored within the source code repository that is also used to store the new release (Version A.B).

Figures 4, 5:
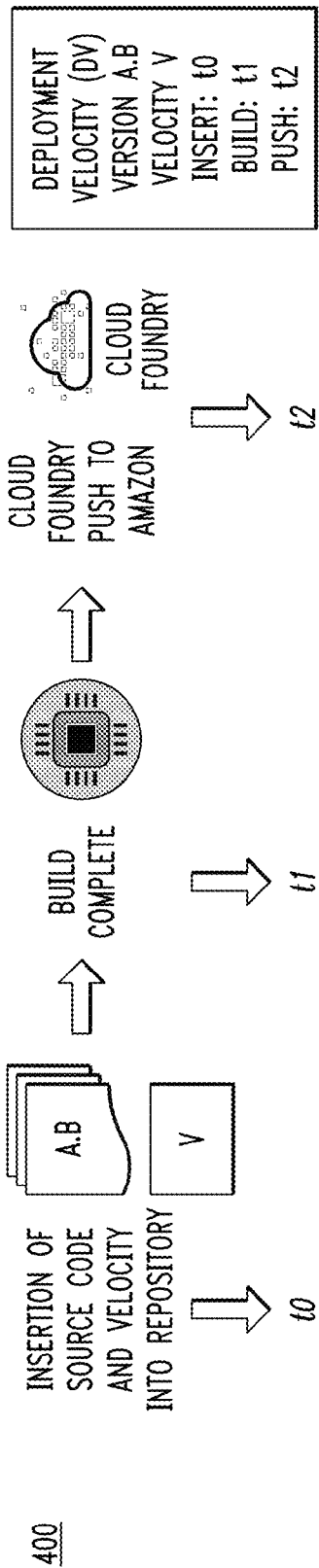
FIG. 4 illustrates creating a deployment velocity record in a development and deployment data valuation management environment according to an embodiment of the invention.
FIG. 5 illustrates association of a velocity metric with data sets in a development and deployment data valuation management environment according to an embodiment of the invention.

As depicted in methodology 400 in FIG. 4, once version A.B has made it into the source code repository, at some point in time the business pushes it into production (e.g., deployed using CloudFoundry®) so that shoppers get new purchasing recommendations based upon location. During this process, each step can generate a timestamp to help calculate the deployment velocity. For example, FIG. 4 shows timestamped deployment (e.g., t0, t1, t2) of the application version A.B from the repository to a production Amazon environment.

Valuation data structures are added to the run-time environment. The valuation data structures keep track of current/previous revisions of the retail software and the associated deployment velocity record. FIG. 5 shows a historical record 500 of previous versions of the application software and ends with the current version. The data sets generated by this version can also be identified, e.g., their identity in a data lake (212), their object identifiers (IDs), directory locations, etc. Thus, advantageously, deployment velocity (DV) metrics are stored and associated (in tabular record 500) with the respective data sets (/home/A.0, /home/A.1, /home/A.B) generated by each version of the retail application, up to and including the current version A.B.

Now that development velocity manifests can be associated with real-time data sets, statements of value can be created against any data set generated by any version of Application A. Consider methodology 600 depicted in FIG. 6.

In this example, the business has chosen to value data based on the complexity of the features added to the latest release. For example, the value of this data set could be 6 (the sum of the complexity) or 3 (the average of the complexity). Value can be calculated (by valuation algorithm Z) across historical data sets by searching for a key "story" (an important feature or an important error fix) or by the name of the developer (e.g., a data scientist), or any of a variety of other fields and/or permutations.

Deployment velocity can also be associated with real-time data sets. Consider methodology 700 depicted in FIG. 7. In this example, a valuation algorithm Z may take into account that a new feature languished for over a month from when it was code complete, and the business may choose to devalue the recommendations emerging from that epoch.

Figure 6:
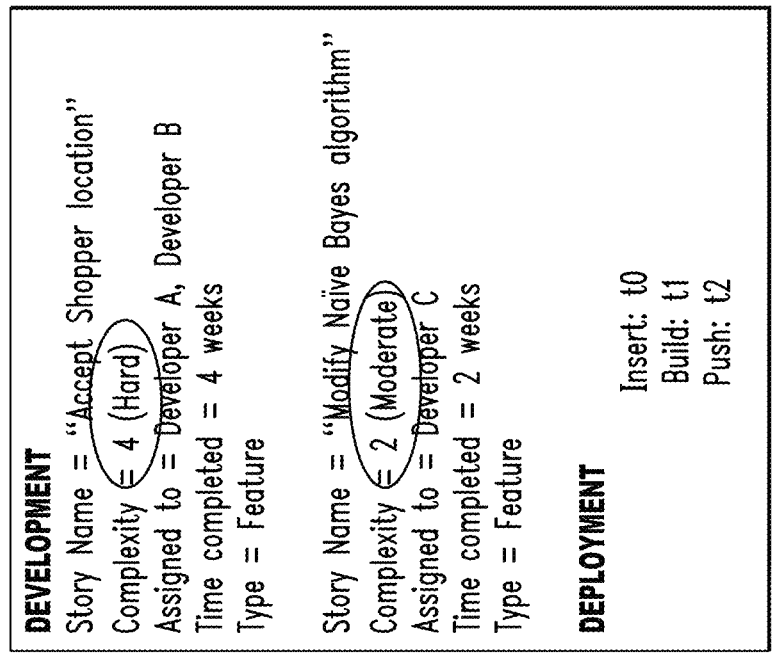
FIG. 6 illustrates a velocity-based valuation algorithm in a development and deployment data valuation management environment according to an embodiment of the invention.
Figure 7:
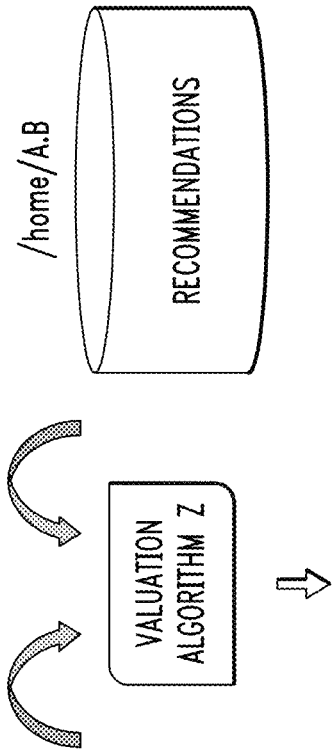
FIG. 7 illustrates a deployment valuation in a development and deployment data valuation management environment according to an embodiment of the invention.
Figure 7:
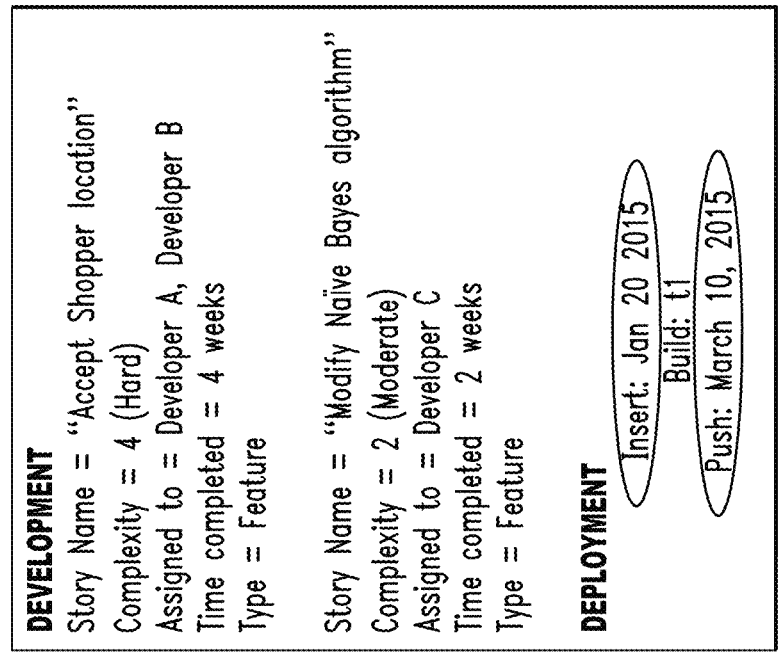

It is to be appreciated that the recommendations illustrated in FIGS. 6 and 7 are essentially tied to revenue in this example. The recommendations provided to end consumers are intended to increase consumer purchasing. If these recommendations are then associated with the actual historical purchasing decisions made as a result of the recommendations, a business can then directly associate revenue with specific development velocity information (e.g., how complex was that release, who worked on it, was it primarily error fixes or features or both) and how fast that release was deployed. This allows a business to gain insight into how critical and/or well-performing the application development and deployment process was to the actual output data sets (the recommendations).

Figure 8:
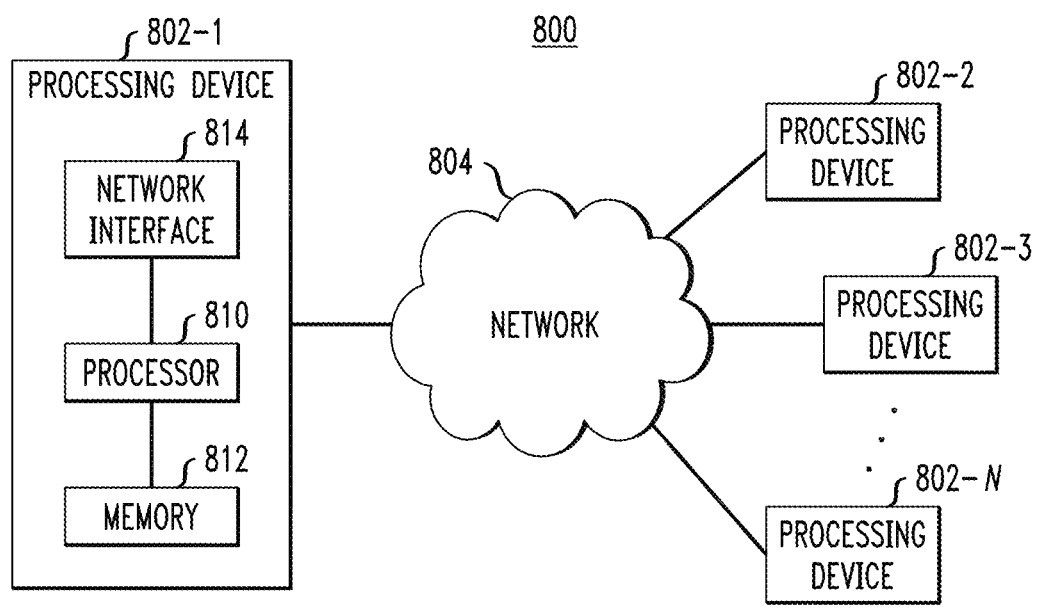
FIG. 8 illustrates a processing platform used to implement a development and deployment data valuation management environment according to an embodiment of the invention.

As an example of a processing platform on which a development and deployment data valuation management environment according to illustrative embodiments (e.g., 200 in FIG. 2) can be implemented is processing platform 800 shown in FIG. 8. The processing platform 800 in this embodiment comprises a plurality of processing devices, denoted 802-1, 802-2, 802-3, . . . 802-N, which communicate with one another over a network 804. It is to be appreciated that the methodologies described herein may be executed in one such processing device 802, or executed in a distributed manner across two or more such processing devices 802. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 8, such a device comprises at least one processor and an associated memory, and implements one or more functional modules for instantiating and/or controlling features of systems and methodologies described herein. Multiple elements or modules may be implemented by a single processing device in a given embodiment.

The processing device 802-1 in the processing platform 800 comprises a processor 810 coupled to a memory 812.

The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random access memory (RAM), read-only memory (ROM) or other types of memory, in any combination. The one or more software programs when executed by a processing device, such as the processing device 802-1, causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the network 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the data valuation system and infrastructure described herein may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

Furthermore, it is to be appreciated that the processing platform 800 of FIG. 8 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 800 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 800 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the development and deployment data valuation management environment may be implemented using one or more processing platforms. A given such processing platform comprises at least one processing device comprising a processor coupled to a memory, and the processing device may be implemented at least in part utilizing one or more virtual machines, containers or other virtualization. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   obtaining at least one development velocity metric indicative of a velocity attribute associated with development of an application program from a development tool used to develop the application program;
   obtaining at least one deployment velocity metric indicative of a velocity attribute associated with deployment of the application program from a deployment tool used to deploy the application program in the application run-time environment from the deployment tool;
   storing the at least one development velocity metric and the at least one deployment velocity metric in an application run-time environment in association with the application program and one or more data sets output by the application program;
   computing one or more valuations for the one or more data sets output by the application program based on one or more of the at least one development velocity metric and the at least one deployment velocity metric, wherein one or more valuations comprise one or more computations of values of the one or more data sets; and
   utilizing the one or more valuations to control at least one of subsequent development of the application program and subsequent deployment of the application program;
   wherein the obtaining, storing, and computing steps are performed by one or more processing devices each comprising a processor and memory.

2. The method of claim 1, further comprising generating a deployment velocity record comprising the at least one deployment velocity metric obtained from the deployment tool.

3. The method of claim 1, wherein the at least one deployment velocity metric comprises one or more timestamps associated with tasks performed during the deployment of the application program.

4. The method of claim 1, wherein the storing step further comprises storing associations between current and past run-time versions of the application program, the at least one deployment velocity metric for each run-time version of the application program, and the one or more data sets respectively output by the current and the past run-time versions of the application program.

5. The method of claim 4, wherein the valuation computing step further comprises computing the one or more valuations for the one or more data sets across the current and the past run-time versions of the application program.

6. The method of claim 5, wherein the valuation computing step further comprises adjusting a valuation computed for a past version of the application program based on a development factor or a deployment factor associated with a later version of the application program.

7. The method of claim 1, wherein each valuation is computed as a function of at least one of the at least one development velocity metric and the at least one deployment velocity metric.

8. The method of claim 1, further comprising presenting the computed valuation via a user interface.

9. The method of claim 1, wherein the development of the application program comprises modifying a previous version of the application program.

10. An article of manufacture comprising a non-transitory processor-readable storage medium having encoded therein executable code of one or more software programs, wherein the one or more software programs when executed by one or more processing devices implement steps of:
    obtaining at least one development velocity metric indicative of a velocity attribute associated with development of an application program from a development tool used to develop the application program;
    obtaining at least one deployment velocity metric indicative of a velocity attribute associated with deployment of the application program from a deployment tool used to deploy the application program in the application run-time environment from the deployment tool;
    storing the at least one development velocity metric and the at least one deployment velocity metric in an application run-time environment in association with the application program and one or more data sets output by the application program;

computing one or more valuations for the one or more data sets output by the application program based on one or more of the at least one development velocity metric and the at least one deployment velocity metric, wherein one or more valuations comprise one or more computations of values of the one or more data sets; and utilizing the one or more valuations to control at least one of subsequent development of the application program and subsequent deployment of the application program.

11. The article of claim 10, wherein the one or more software programs when executed by one or more processing devices further implement the step of generating a deployment velocity record comprising the at least one deployment velocity metric obtained from the deployment tool.

12. The article of claim 10, wherein the at least one deployment velocity metric comprises one or more timestamps associated with tasks performed during the deployment of the application program.

13. The article of claim 10, wherein:
the storing step further comprises storing associations between current and past run-time versions of the application program, the at least one deployment velocity metric for each run-time version of the application program, and the one or more data sets respectively output by the current and the past run-time versions of the application program; and the valuation computing step further comprises computing the one or more valuations for the one or more data sets across the current and the past run-time versions of the application program.

14. The article of claim 13, wherein the valuation computing step further comprises adjusting a valuation computed for a past version of the application program based on a development factor or a deployment factor associated with a later version of the application program.

15. A system comprising:
one or more processors operatively coupled to one or more memories and configured to:
obtain at least one development velocity metric indicative of a velocity attribute associated with development of an application program from a development tool used to develop the application program;
obtain at least one deployment velocity metric indicative of a velocity attribute associated with deployment of the application program from a deployment tool used to deploy the application program in the application run-time environment from the deployment tool;
store the at least one development velocity metric and the at least one deployment velocity metric in an application run-time environment in association with the application program and one or more data sets output by the application program;
compute one or more valuations for the one or more data sets output by the application program based on one or more of the at least one development velocity metric and the at least one deployment velocity metric, wherein one or more valuations comprise one or more computations of values of the one or more data sets; and
utilize the one or more valuations to control at least one of subsequent development of the application program and subsequent deployment of the application program.

16. The system of claim 15, wherein the one or more processors are further configured to generate a deployment velocity record comprising the at least one deployment velocity metric obtained from the deployment tool.

17. The system of claim 15, wherein the at least one deployment velocity metric comprises one or more timestamps associated with tasks performed during the deployment of the application program.

18. The system of claim 17, wherein the storage of one or more velocity metrics further comprises storage of associations between current and past run-time versions of the application program, the at least one deployment velocity metric for each run-time version of the application program, and the one or more data sets respectively output by the current and the past run-time versions of the application program.

19. The system of claim 18, wherein the valuation for the one or more data sets is computed across the current and past run-time versions of the application program.

20. The system of claim 19, wherein the computation of the valuation further comprises an adjustment of a valuation computed for a past version of the application program based on a development factor or a deployment factor associated with a later version of the application program.

* * * * *